(12) United States Patent
Kastaniotis et al.

(10) Patent No.: US 11,138,413 B2
(45) Date of Patent: *Oct. 5, 2021

(54) FAST, EMBEDDED, HYBRID VIDEO FACE RECOGNITION SYSTEM

(71) Applicant: IRIDA LABS S.A., Patras (GR)

(72) Inventors: Dimitris Kastaniotis, Athens (GR); Ilias Theodorakopoulos, Aigio (GR); Nikos Fragoulis, Patras (GR)

(73) Assignee: IRIDA LABS S.A., Patras (GR)

( * ) Notice: Subject to any disclaimer, the term of this patent is extended or adjusted under 35 U.S.C. 154(b) by 0 days.

This patent is subject to a terminal disclaimer.

(21) Appl. No.: 16/715,827

(22) Filed: Dec. 16, 2019

(65) Prior Publication Data

US 2020/0117886 A1 Apr. 16, 2020

Related U.S. Application Data

(63) Continuation of application No. 15/686,797, filed on Aug. 25, 2017, now Pat. No. 10,509,952.

(60) Provisional application No. 62/381,309, filed on Aug. 30, 2016.

(51) Int. Cl.
*G06K 9/00* (2006.01)
*G06K 9/62* (2006.01)
*G06K 9/46* (2006.01)

(52) U.S. Cl.
CPC ..... *G06K 9/00295* (2013.01); *G06K 9/00241* (2013.01); *G06K 9/00275* (2013.01); *G06K 9/00288* (2013.01); *G06K 9/4628* (2013.01); *G06K 9/4661* (2013.01); *G06K 9/627* (2013.01); *G06K 9/6256* (2013.01); *G06K 9/6277* (2013.01)

(58) Field of Classification Search
CPC .... G06K 9/00422; G06K 9/66; G06K 9/6267; G06N 3/0454; G06N 3/084; G06N 3/0481; G06N 3/08; G06N 3/04; G06N 20/00; G06N 3/088; G06N 5/046
See application file for complete search history.

(56) References Cited

U.S. PATENT DOCUMENTS

| 1,050,995 A1 | 12/2019 | Kastaniotis et al. |
| 2010/0202697 A1 | 8/2010 | Matsuzaka et al. |
| 2011/0235870 A1 | 9/2011 | Ichikawa et al. |
| 2012/0314914 A1 | 12/2012 | Karakotsios et al. |

OTHER PUBLICATIONS

Zhang, "Improving Object Detection with Deep Convolutional Networks via Bayesian Optimization and Structured Prediction" 2015, IEEE (Year: 2015).*

(Continued)

*Primary Examiner* — Alex Kok S Liew
(74) *Attorney, Agent, or Firm* — Jason H. Vick; Sheridan Ross, PC

(57) ABSTRACT

An exemplary embodiment relates to the field of Automatic Face Recognition (AFR) systems. More specifically one exemplary embodiment relates at least to a method and a system capable of recognizing the face of a person using a device equipped with a camera of any kind and an associated computer, such as an embedded computer. The system is alternatively suitable to be implemented as an embedded system with minimal processing hardware capabilities, consuming very low power.

18 Claims, 8 Drawing Sheets

(56) References Cited

OTHER PUBLICATIONS

Duda, Richard O. et al. "Pattern Classification," 2nd Edition, Willey 2000 (738 pages).
Georghiades, Athiodoros S. et al. "From Few to Many: Illumination Cone Models fro Race Recognition Under Variable Lighting and Pose" IEEE Transactions on Pattern Analysis and Machine Intelligence; vol. 23, No. 6; Jun. 2001 (18 pages).
Hinton, Geoffrey et al. "Distilling the Knowledge in a Neural Network," arXiv:1503.02531, Mar. 9, 2015.
Hyvärinen, Aapo et al. "Independent Component Analysis: Algorithms and Applications" Neural Networks; vol. 13. Issue 4-5, Mar. 28, 2000.
Matsugu, Masakazu "Facial Expression Recognition Combined with Robust Face Detection in a Convolutional Neural Network" IEEE; 2003.
Puzicha, J. et al. "Empirical Evaluation of Dissimilarity Measures for Color and Texture," The Proceedings of the Seventh IEEE International Conference on Computer Vision, 1999, (vol. 2), pp. 1165-1172.
Taigman, Yaniv et al. "DeepFace: Closing the Gap to Human-Level, Performance in Face Verification" In Proc. CVPR, 2014.
van der Maaten, Laurens et al. "Visualizing Data using t-SNE," Journal of Machine Learning Research, 2008. vol. 9, pp. 2579-2605.
Office Action (Restriction Requirement) for U.S. Appl. No. 15/686,797, dated Jan. 9, 2019.
Office Action for U.S. Appl. No. 15/686,797, dated Apr. 24, 2019.
Notice of Allowance for U.S. Appl. No. 15/686,797, dated Sep. 12, 2019.

\* cited by examiner

FAST, EMBEDDED, HYBRID VIDEO FACE RECOGNITION SYSTEM

RELATED APPLICATIONS

This application is a Continuation of U.S. patent application Ser. No. 15/686,797, filed Aug. 25, 2017, now U.S. Pat. No. 10,509,952, which claims the benefit of and priority under 35 U.S.C. § 119(e) to U.S. Patent Application No. 62/381,309 filed Aug. 30, 2016, entitled "Fast, Embedded, Hybrid Video Face Recognition System" each of which are incorporated herein by reference in their entirety.

BACKGROUND

An exemplary embodiment relates to the field of Automatic Face Recognition (AFR) systems. More specifically one exemplary embodiment relates at least to a method and a system capable of recognizing the face of a person using a device equipped with a camera of any kind and an associated computer, such as an embedded computer. The system is alternatively suitable to be implemented as an embedded system with minimal processing hardware capabilities, consuming very low power.

Automatic Face Recognition is an important part of understanding video content, and plays a significant role in many modern systems, including personal computers (PCs), stationary or portable digital entertainment systems, and mobile devices such as smartphones, tablets, etc.

There are many approaches for performing face recognition. Most of these approaches are based on a Personal Computer (PC) to carry out the required processing tasks. In such systems, a video digitizer samples the camera sensor which is then processed by the face recognition software running on the PC.

Recognition accuracy is a key aspect when it turns to face recognition systems. The system needs to be very accurate in this task, recognizing among several registered (enrolled) users the right person with high success rate and at the same time rejecting any unenrolled person also with high success rate.

Particularly on mobile systems, where the face recognition functionality is intended to be used by a security module for device security—locking and unlocking the device with face recognition—the recognition accuracy is of paramount importance. However, this particular use case poses additional challenges since the acquired facial images suffer from pose and illumination variations. These challenges further complicate and present technical problems for the face recognition system. Therefore, in these cases, a trade-off emerges between face recognition accuracy on one hand, and fast response time/low-power consumption on the other.

Recently, a new class of face recognition systems has emerged known as deep-learning systems (Y. Taigman, M. Yang, M. Ranzato, and L. Wolf. Deep-Face: Closing the gap to human-level, performance in face verification. In Proc. CVPR, 2014—incorporated herein by reference in its entirety). These systems use a Convolutional Neural Networks (CNN) approach in order to achieve high face recognition accuracy and quality. A CNN is a system that is able to "learn" to recognize a specific data pattern through a repetitive process of processing, using annotated data and adapting its parameters towards minimizing a cost function. Its ability to learn robust feature representations has proved to be a very powerful technique in many modern machine learning problems and especially in computer vision.

However, when a face recognition system is to be used for face recognition on a mobile device, apart from recognition accuracy, recognition speed and low power consumption are also very important features. The system should be able to respond quickly and consume low power in order to comply with the limited power budget of a modern mobile device. Processing speed and power consumption depends both on the algorithm complexity and the processor computing capacity.

Nevertheless, besides the worth-mentioned technological developments in the field of processing hardware, the computing capacity of modern mobile processors cannot cope with the complexity of the modern state-of-the-art face recognition algorithms and in particular with the deep-learning based systems referred to above.

SUMMARY

In an exemplary embodiment, a novel face recognition system is described combining the accuracy of a modern state-of-the-art deep-learning approach with the computational efficiency of a conventional machine learning classifier. Thus, the system is able to achieve both the desirable recognition accuracy and the high speed/low-power consumption features. In an exemplary embodiment, the use of a number of sequential images (e.g. consequent video frames), is used for solving the pose and illumination variability problems.

One exemplary embodiment is directed toward a stand-alone computer-camera method and system, capable of recognizing faces. This is achieved by using an on-board computer/CPU/processor and memory in order to analyze the video stream recorded by the camera sensor, and can be used with any type of camera and/or camera sensor. The system features specific characteristics making it extremely fast, accurate and power-economical in recognizing faces.

The algorithms incorporated in this system are specially implemented in order to be able to be ported on an embedded computer system, which usually features inferior capabilities in terms of processing power and memory and battery than a general-purpose computer.

In one aspect, the system uses a robust convolutional neural network (CNN) as a feature extraction unit, in conjunction with a special pattern classification unit.

In another aspect, a special CNN-training procedure is also provided in order to result in a CNN architecture explicitly able to serve as a feature extraction front-end of a classifier. The classifier itself is specifically designed to be in line with the special hardware features of an embedded computer system.

In still another aspect, a special training procedure has been developed to be able to guarantee the Gaussianity of the resulting mathematical face descriptors, further boosting the efficiency of the overall system in terms of recognition accuracy, speed and power consumption.

In yet another aspect, a number of sequential images (e.g. subsequent video frames), are used for solving the pose and illumination variability problem. This requires a special classifier various embodiments of which are also described herein.

BRIEF DESCRIPTION OF THE DRAWINGS

The exemplary embodiments of the invention will be described in detail, with reference to the following Figures, wherein.

DETAILED DESCRIPTION OF THE INVENTION

Figure 1:
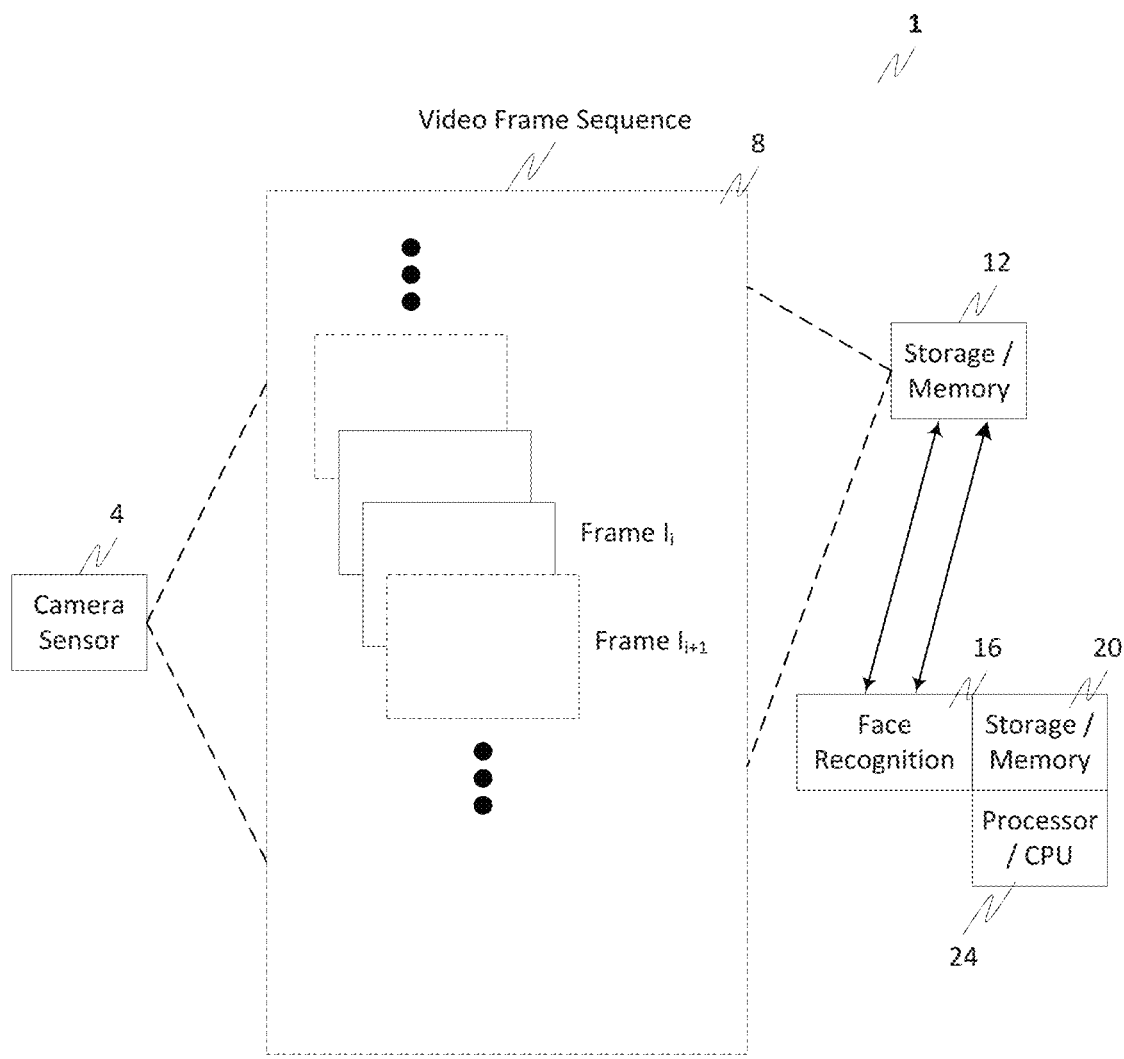
FIG. 1 illustrates an exemplary face recognition system in accordance with one exemplary aspect.

In accordance with one exemplary embodiment, a system 1 is disclosed that is able to recognize and identify a person based on their face as it appears in a video sequence. The system includes, in addition to conventional componentry, a camera sensor 4, a video frame sequence 8, storage/memory, 12, a face recognition sub-system 16, storage/memory 20 and a CPU/processor 24.

This system uses a camera sensor 4 which captures the video frames 8, and stores the most recent frame in a memory 12 and then processes the most recent frame with the face-recognition subsystem 16, which is connected to the storage/memory 20 and CPU/processor 24, in order to extract face recognition decisions.

Figure 2:
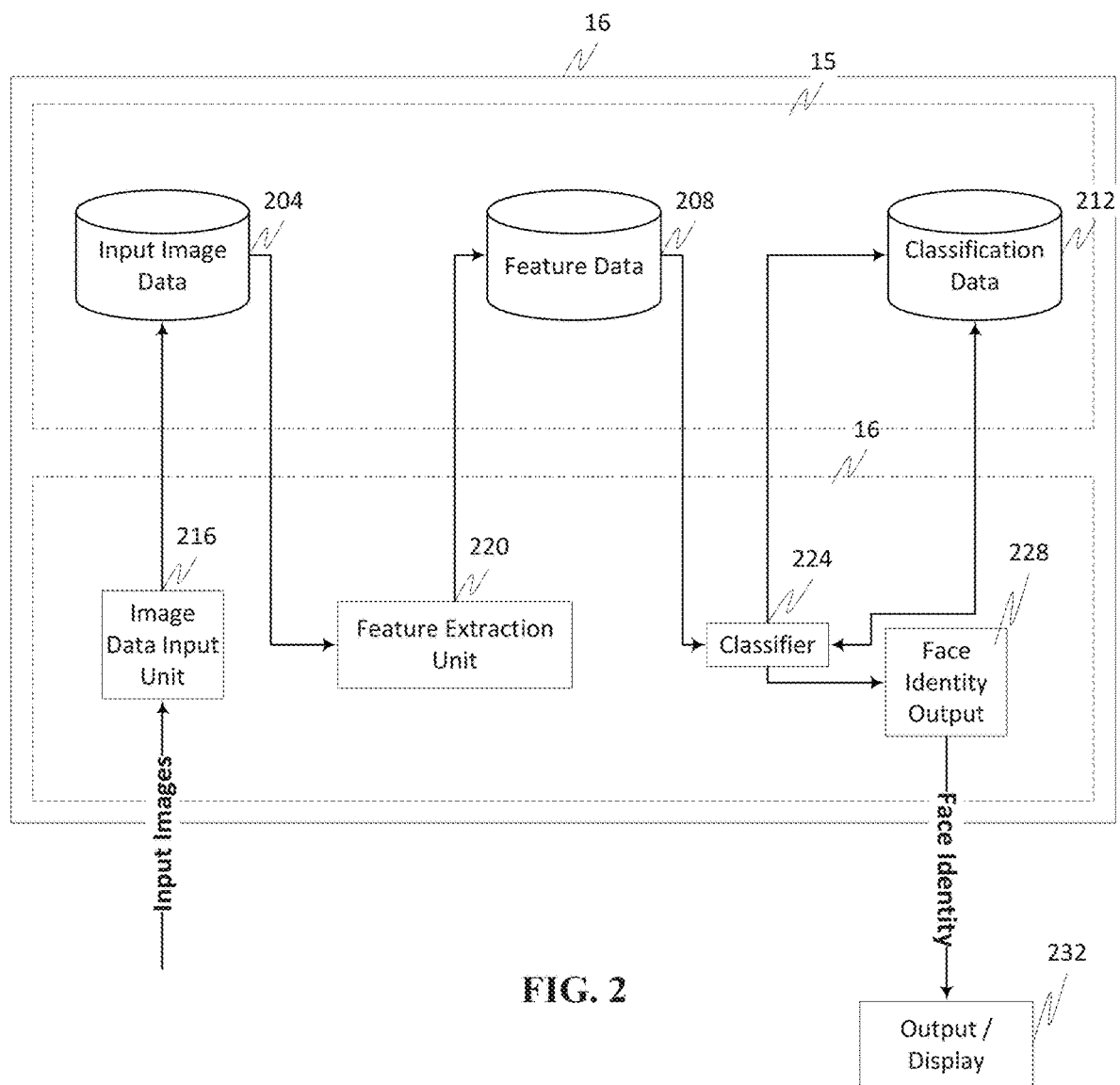
FIG. 2 illustrates an exemplary face recognition unit of FIG. 1 in accordance with one exemplary aspect.

An exemplary face recognition subsystem through which the system 1 analyzes the stream of face images in the video frame sequence 8 and identifies the person to which a face belongs, as shown in greater detail in FIG. 2.

Specifically, the exemplary face recognition subsystem 16 includes storage for input image data 204, feature data 208, and classification data 212, and also includes an image data input unit 216, a feature extracting unit 220, a classifier 224 and a face identity output 228, optionally connected to an output/display 232 and/or a security module that can at least lock or unlock a device.

This exemplary embodiment of the face recognition subsystem 16 functions as follows: First a frame $I_i$, (See sequence 8 in FIG. 1) containing the face of a person, is received in the image data input unit 216, stored in the input image data storage/repository 204, and is forwarded to the feature extraction unit 220. The feature extraction unit 220 calculates a mathematical descriptor, represented by a vector of numbers stored in the feature data repository 208. This descriptor stored in the feature data repository 208 is then provided to the classifier 224, which stores the feature in the classification data repository 212.

The classifier 224 uses the last k stored descriptors in order to produce a face recognition result by using a number of k video frames containing the face of the same person. Finally, the result for the k last frames (in a preferred embodiment k=100 but is not limited thereto and can be of any value) is fed in the face identity output unit 228 which outputs the face identity to an output, such as display 232.

In the following sections, the above functionality is explained in greater detail.

Feature Extraction Unit 220

The feature extraction unit 220 extracts a reliable mathematical description of a face, which is in the relative terminology referred to as a "feature."

Instead of using a hand-crafted feature descriptor (e.g., Local Binary Patterns-LBP, Histogram of Oriented Gradients-HoG, Gabor descriptors, SIFT descriptor, etc.), one exemplary aspect uses an innovative and more robust approach based on a properly trained CNN.

Convolutional Neural Networks

Figure 3:
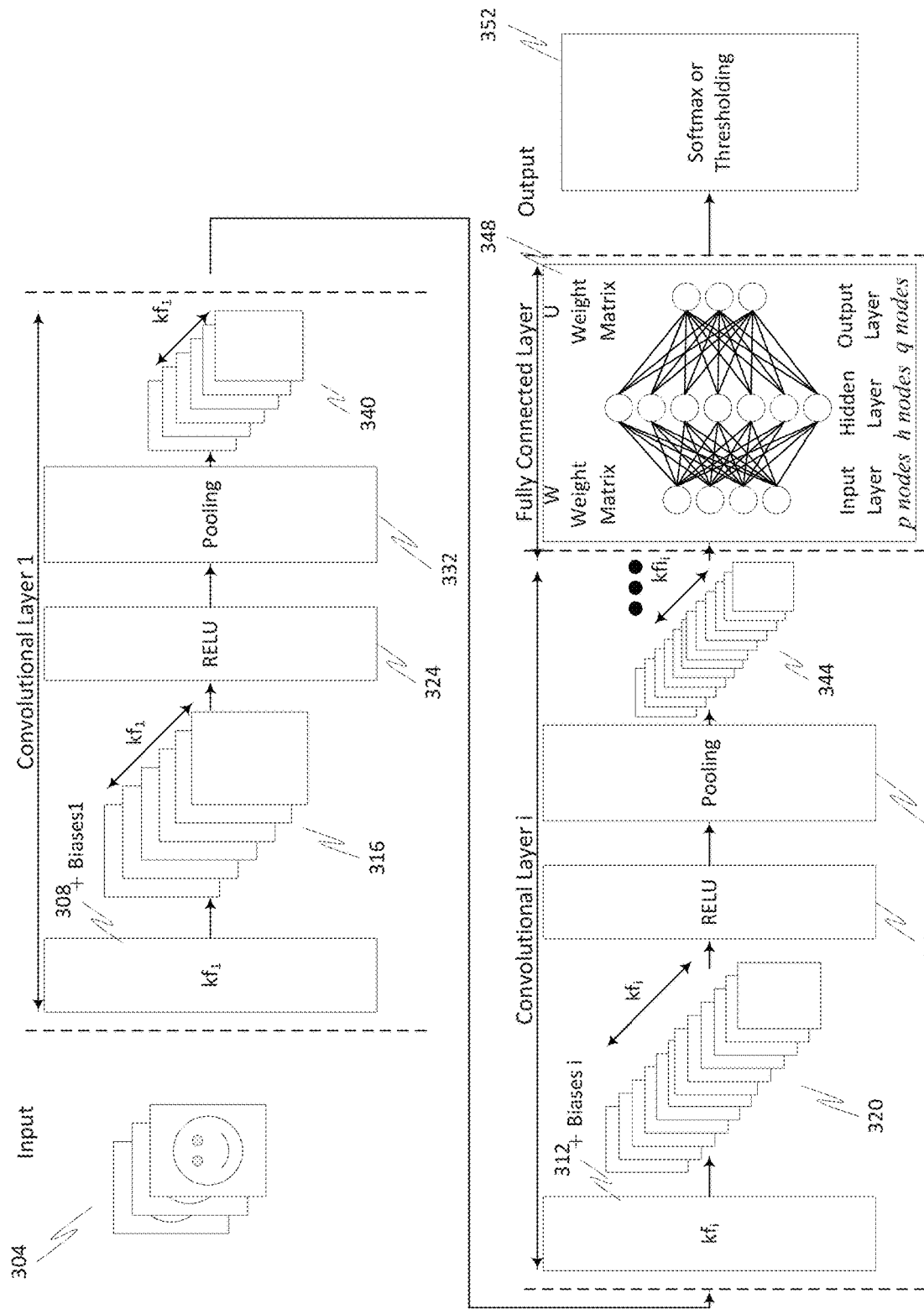
FIG. 3 illustrates a general CNN architecture in accordance with one exemplary aspect.

A Convolutional Neural Network—CNN (FIG. 3) includes, in general, a number of convolutional and sub-sampling layers optionally followed by fully connected layers.

The input 304 to a convolutional network is an image of size m×m×r where m is the height and width of the input image and r is the number of channels, e.g., an RGB image has r=3.

In the next stages follow a number of convolutional layers. A convolutional layer 308, 312 will have $k_{fi}$ filters, or kernels, of size n×n×q where n is smaller than the dimension of the image, i is the number of the layer, and q can either be the same as the number of channels r or smaller and may vary for each kernel. Each of these filters are represented by a 3D matrix (or tensor) of size $k_{fi}$×n×n×q. Each filter performs the following mathematical operation known as convolution:

$$y_{ij'k'} = \Sigma_{ijk} w_{ijkk'} x_{i+i'j+j'k} \tag{1}$$

The size of the filters gives rise to the locally connected structure which is then convolved with the image to produce $k_{fi}$ feature maps of size either m×m or smaller 316, 320.

Each map is then subsampled typically with mean or max pooling over p×p contiguous regions 332, 336. This is an average or max operation over p×p numbers to produce one number, either by taking the average of these numbers or by taking the maximum number between them. This operation results on a number $k_{fi}$ of feature maps of smaller size 340, 344.

Either before or after the subsampling layer an additive bias and nonlinearity (sigmoidal, hyperbolic tangent, etc.) or a rectified linear unit (RELU, leaky RELU, etc.) is applied to each feature map 324, 328.

After a number L of convolutional layers there may be any number of fully connected layers 348. The densely connected layers are identical to the layers in a standard fully connected multilayer neural network. (See *Pattern Classification*, 2nd Edition, Richard O. Duda, Peter E. Hart, David G. Stork Chapter 4, Chapter 6, and Chapter 10, Willey 2000—which is incorporated herein by reference in its entirety).

The output of such a network is a vector of numbers, from which the probability for a specific input image to belong to the specific class (e.g., being the face of a specific person) can be inferred. For that reason, the output layer 352 of the CNN can be a "softmax" layer which maps the network output vector to class probabilities. But the required type of output should be a single binary decision for the specific image to belong to a person. That requires the output corresponding to a specific class to be "1" and for all the other classes to be "0". This is achieved through a thresholding on class probabilities: Each output takes the value "0" if is smaller than a threshold and "1" otherwise.

Each convolutional network is defined by its architectural details (e.g., size and number of convolutional kernels, number and kind of pooling units, and connectivity between convolutional layers), as well as its parameters which are the coefficients of the convolutional kernels and the values of biases.

A CNN comprised by more than three layers is named a deep-learning network, and normally the inference accuracy of a CNN increases as the CNN gets deeper. The accuracy obtained by deep architectures on image classification and object detection tasks, prove that depth of representation is indeed the key to a successful implementation.

Training a CNN

Figure 4:
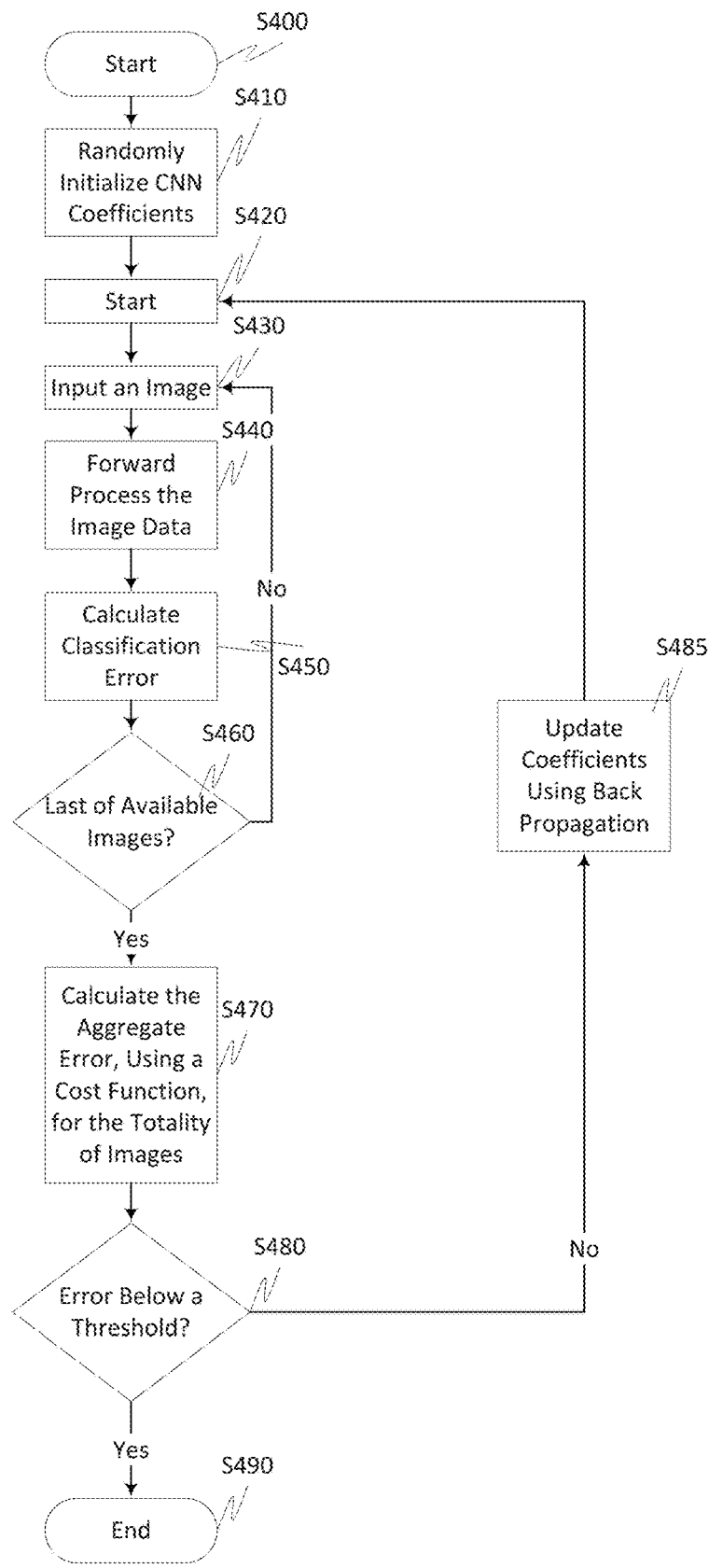
FIG. 4 illustrates an exemplary method for determining coefficients of a CNN network during a training phase in accordance with one exemplary aspect.

The coefficients of a CNN network are calculated during a training phase as illustrated in FIG. 4. In this phase the network operates over an annotated face image dataset. Control begins in step S400 and continues to step S410. In step S410, the CNN coefficients are initialized to some value (e.g., using a random number generation algorithm). Then, each face image in the database is fed into the CNN network (steps S420, S430) which in turn processes the image and outputs in step S440 a decision about the identity of the person in the image. The output of the network is compared with the correct identity stored in the database annotation data in step S450 to determine a classification error. This process results in a classification error for each image.

In step S460, this process loops back to step S430 to repeat over the entire face-image database, and the error is aggregated over the entire database in step S470. The error is then compared to a threshold in step S480. If the error is above the threshold, this error is then used to update the coefficients of the CNN network by using a backpropagation algorithm in step S485. If the error is bellow this threshold, the process is terminated in step S490 and the CNN network is considered as trained.

The error of the processing is calculated by using a cost function. This function is selected carefully, since it heavily influences the required functionality of the CNN network. Thus, the cost function could also use information from other point(s) (not the output) as will be described below.

Reducing Complexity on a CNN

The number of coefficients required to describe a CNN is directly related to its architecture as defined above: the more convolutional layers, the more parameters. Therefore, a basic downside of the deep learning CNN architectures is that they require hundreds of MBytes in coefficients for the convolutional kernels to operate. Such requirements can render the embedded implementation of similar networks rather prohibitive. On a typical scenario where a CNN has to operate on a video stream, in order to produce a real-time video annotation captured by a camera sensor, the allocation and data transfers needed to load are huge (e.g., 600 MB of coefficients). This is a rather intense workload, for an embedded device's memory, particularly when it has to be completed within a limited time period, (e.g., starting when the user opens the camera app (e.g., initialization) and ending when the video recording starts).

In order to address such issues an exemplary embodiment utilizes a different approach directed towards the use of a special CNN architecture that requires significantly fewer coefficients. Such a CNN is based on the smart combination of small convolutional kernels and a complex network architecture that enables information to flow through different paths, facilitating the construction of sufficiently high-order image representations that are suitable for the face recognition application. Such approaches result in a coefficients' size of a couple of Megabytes, which means a reduction of 100 times or more.

Figure 5:
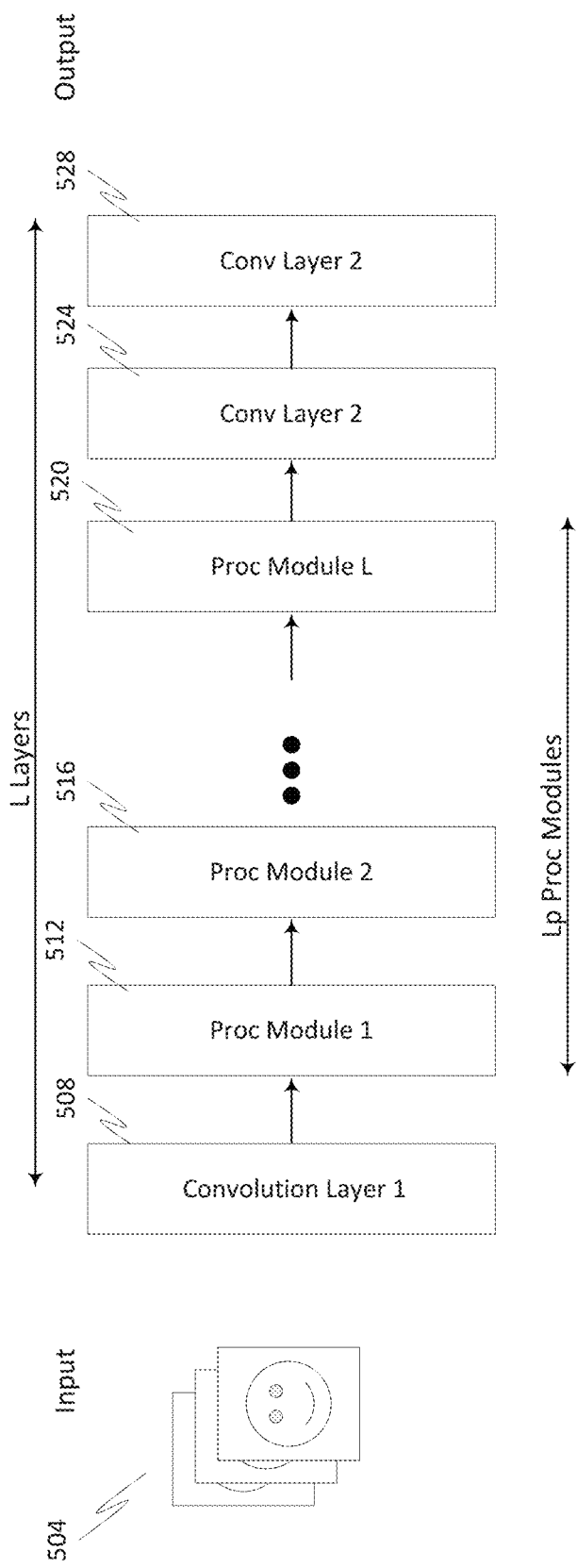
FIG. 5 illustrates an exemplary embodiment of a compressed architecture in accordance with one exemplary aspect.

In an exemplary embodiment, a specific compressed architecture is used, which is composed in general by sequentially processing cells, as shown in FIG. 5 comprised by L convolutional layers 508 and $L_P$ processing modules 512-520. The output of each processing cell is passed for further processing into the next processing cell. The output of the last processing cell 520 is fed into the last stage of the network 524, 528 which is comprised by a number of convolutional or/and full-connected layers that produce the desired output.

Figure 6:
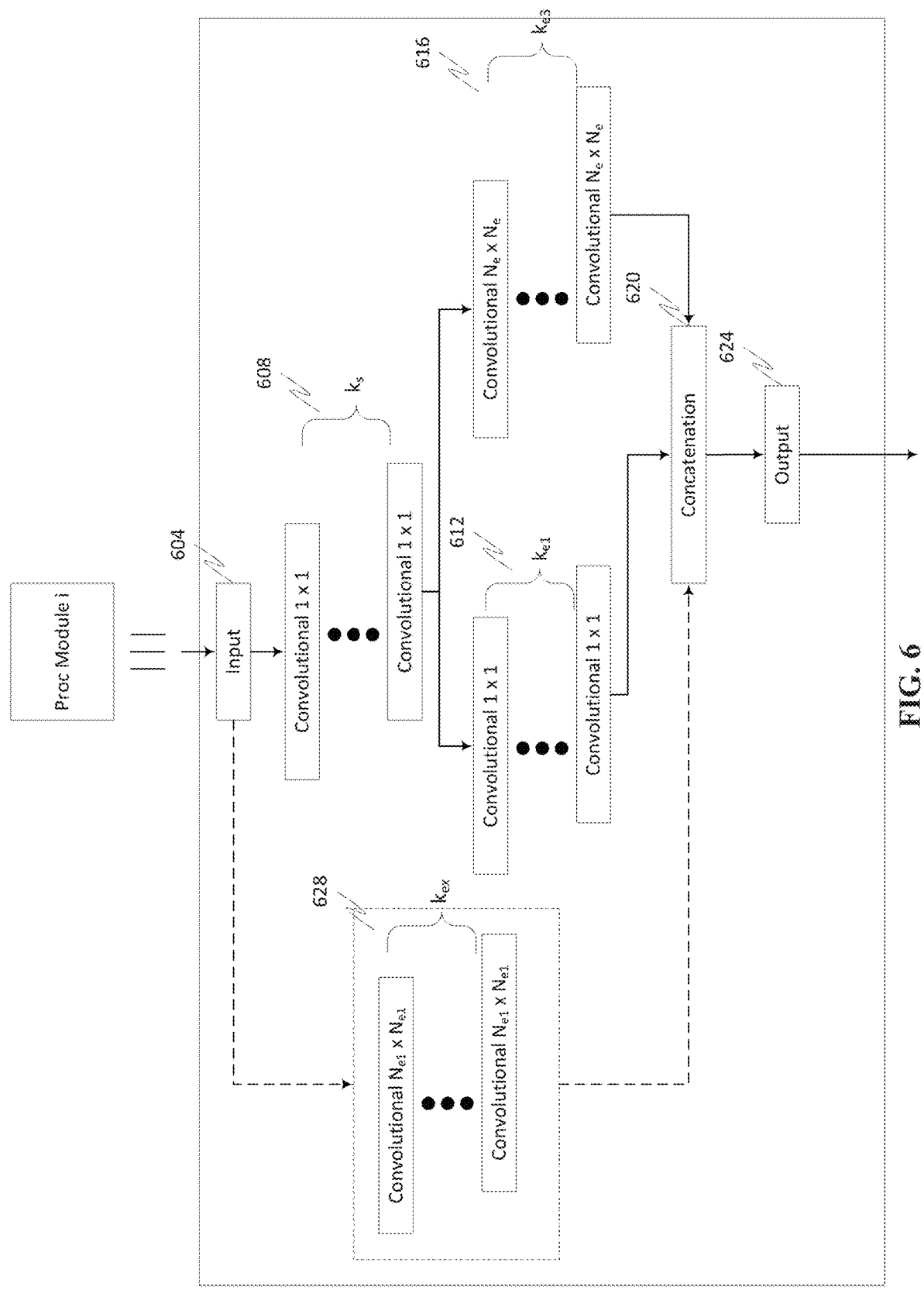
FIG. 6 illustrates an exemplary embodiment of a compressed CNN processing module in accordance with one exemplary aspect.

The general architecture within all processing modules is similar, although the number and size of kernels as well as the coefficients can be unique for each processing cell. An exemplary internal architecture of a processing module is shown in FIG. 6.

In accordance with one exemplary embodiment, the input 604 is initially processed by a block of $K_S$ convolutional layers 608 based on 1×1 kernels in order to reduce the number of channels. The output of these layers is then directed into a number of blocks of convolutional layers 612, a number of which (one in a preferred embodiment although the technology is not limited thereto) is based on $K_{e1}$ layers based on 1×1 kernels, a number of blocks (one in a preferred embodiment) comprised by $K_{e3}$ layers 616 based on $N_e \times N_e$ kernels and also into a separate block of convolutional layers comprised by $K_{SX}$ layers 628 based on $N_e \times N_e$ kernels directly feeding the output. The outputs of all units 608, 612, 616 are combined by the concatenation unit 620 via element-wise operations and concatenation of the different channels, producing the output of the processing cell.

Any number of the convolutional layers 608-628 can be substituted by processing sub-cells in other to further reduce the total number of model's coefficients.

In an exemplary embodiment of the processing module, the parameters are $K_S=16$, $K_{e3}=16$, $K_{e1}=16$, $K_{eX}=0$, $N_e=3$. In a preferred embodiment of a CNN such that of FIG. 5, 8 such modules are used ($L_P=8$) with the following exemplary, non-limiting parameters:

TABLE 1

| Proc. Module | $K_{e1}$ | $K_{e3}$ | $K_S$ | $K_{eX}$ |
|---|---|---|---|---|
| 1 | 64 | 64 | 16 | 0 |
| 2 | 64 | 64 | 16 | 0 |
| 3 | 128 | 128 | 32 | 0 |
| 4 | 128 | 128 | 32 | 0 |
| 5 | 192 | 192 | 48 | 0 |
| 6 | 192 | 192 | 48 | 0 |
| 7 | 256 | 256 | 64 | 0 |
| 8 | 256 | 256 | 64 | 0 |

Training a CNN Network to Work as a Feature Extraction Unit

Normally, a CNN is an autonomous classification system, which is trained to perform a specific classification task i.e., recognize a face, etc. However, and in accordance with one embodiment, the CNN network is used in another fashion. More specifically, in an exemplary embodiment, a CNN is initially trained in order to be able to discriminate between faces; then a fine-tune procedure is followed and finally the CNN network is modified in order to be able to output a reliable feature vector instead of outputting the classification result S720 in FIG. 7.

This is achieved by removing the final layer of the full-connected module of the CNN, and use the inputs to this layer as a feature vector.

This action is simultaneously accompanied by a change to the CNN functionality. The target is to end up with a CNN, being able only to discriminate between two different faces (e.g., to decide with high confidence that two faces are the same or not the same) and not to recognize a specific face.

Figure 7:
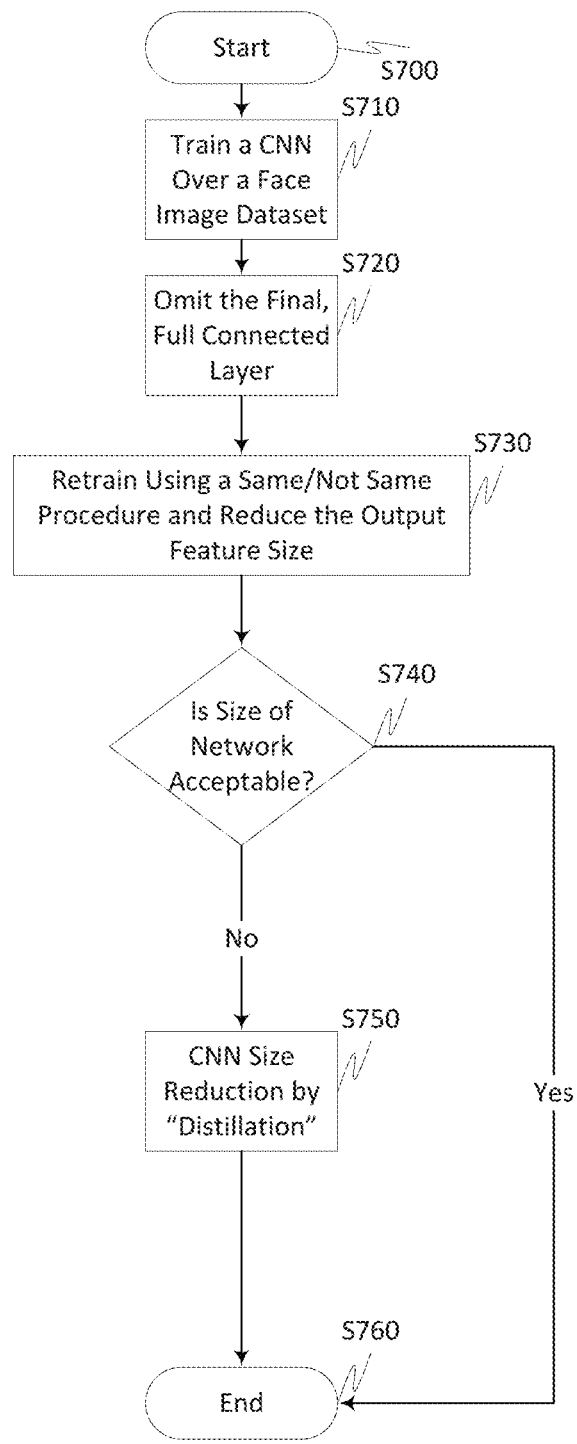
FIG. 7 illustrates an exemplary flowchart illustrating a method for a compressed CNN training strategy in accordance with one exemplary aspect.

In one exemplary embodiment, a special training approach has been devised as outlined in FIG. 7. Control begins in step S700 and continues to step S710 where, in a first phase, the network is trained in step S710 in order to be able to discriminate between the face images in the database. That means that the network should be able to achieve a high recognition accuracy on the specific database expressed. This is achieved my modifying the cost function of the CNN network, in order to output a different feature vector for a different face image. As discussed, the final, fully connected layer is omitted in step S720.

In the next phase in step S730, the CNN network is retrained by modifying the cost function to use a special metric learning approach. This approach focuses on minimizing the intra-class and maximizing the inter-class distances. The target is to end up with a CNN, able at least to discriminate between two different faces (e.g., to decide with high confidence that two faces are the same or not the same), instead of recognizing a specific face. In addition, (since the size of a mathematical feature heavily influences the complexity of the subsequent classification system), the resulting feature vector size is simultaneously reduced in this training phase. Specifically in this approach, the D-sized output vector $\varphi(\varphi(1_t) \in R^D)$ of the CNN is normalized and projected to a vector of size L, (where L<<D), using an affine projection $\hat{x}_t = W' \varphi(1_t)/\|\varphi(1_t)\|_2$ where W' is a projection matrix of size L×D ($W' \in R^{L \times D}$).

This procedure has two key characteristics. The first characteristic is that the feature vector size is reduced, which means that it is not equal to the number of classes (i.e., number of different faces), but it is of the (arbitrary) size. In one exemplary embodiment, the size to be equal to 1024, of course with other values being usable without limitation.

The second characteristic is that the projection W' is trained to minimize one the following, empirical loss functions:

Triplet Loss:

$$E(W') = \Sigma_{(a,p,n) \in T} \max\{0, a - \|x_a - x_n\|_2^2 + \|x_a - x_p\|_2^2\},$$
$$\hat{x}_i = W' \varphi(l_i)/\|\varphi(l_i)\|_2 \quad (2a)$$

Here $\alpha \geq 0$ is a fixed scalar representing a learning margin parameter and T is a collection of training triplets. A triplet (a, p, n) contains an anchor face image a as well as a positive $p \neq a$ and negative n examples of the anchor's identity.

Contrastive Loss:

$$E = \Sigma_{(a,b) \in T} (y) d^2 + (1-y) \max\{a-d, 0\}^2, d = \|a-b\|_2 \quad (2b)$$

where y is the label indicating whether or not two faces a and b belong to the same person (y=1) or not (y=0) and $\alpha \geq 0$ is a fixed scalar representing a learning margin parameter. In one exemplary embodiment, a contrastive-loss cost function has been used.

Training CNN to Output Features Following a Specific Distribution

In accordance with one exemplary embodiment, the aforementioned original CNN network is trained in order to generate features that satisfy an additional criterion: An optimal fit of the feature vectors of a specific person into a Gaussian distribution. A Gaussian feature distribution is essential for enhancing the accuracy of the subsequent classifier, since the majority of the classification methods assume normal feature distributions.

To this end, and for the training, the cost function is modified and augmented with an extra term measuring the Gaussianity (i.e., how well a normal distribution describes the data) of a distribution. Various metrics can be used, to obtain the Gaussianity of a distribution such as the Skewness, the Kurtosis, the Negentropy the Mutual Information function or other functions such as the following (See Hyvärinen, A.; Oja, E. (2000). "Independent component analysis: Algorithms and applications" (PDF). Neural Networks. 13 (4-5): 411-430. doi:10.1016/50893-6080(00) 00026-5. PMID 10946390—which is incorporated by reference in its entirety):

$$J(y) = \Sigma_{i=1}^{p} k_i [E\{G_1(y)\} - E\{G_2(y)\}]^2, \quad (3)$$

with $G_1(u) = \log \cos h(u)$ and $G_2(u) = e^{-u^2}$

In this case, the training dataset can also be modified in order to contain an adequate number of face images of the same person and the training procedure is now iterated using batches of the data having an appropriate size. This procedure can be generalized in order to allow the training to follow a distribution of a different kind.

Further Reduction of the Network Size

In an exemplary embodiment, the size of the CNN can be further reduced by a factor of 5 or so, by applying a model-compression technique, making the resulting CNNs more suitable for an embedded implementation. To this end, in an optional embodiment, and if the size of the network in step S740 is not acceptable, the size and thus the complexity of the feature extraction unit is further reduced by implementing a simplification procedure via CNN modeling technique known as distillation (See G Hinton, O Vinyals, J Dean, Distilling the knowledge in a neural network, arXiv preprint arXiv:1503.02531, 2015—arxiv.org—which is incorporated herein by reference in its entirety). This procedure, in step S750, which targets the transfer of the generalization ability inherent on a large CNN to a smaller CNN, involves the training of the new, smaller and simpler CNN (e.g., the distilled model), in order to have a similar response with the original, larger network on the same or any other database. In other words, in distillation step S750 the target is to train a CNN to have identical response with another CNN.

This procedure also involves the modification of the final functional softmax unit if this is present. A softmax unit is an output layer that converts the logit $z_i$, (i.e., the output of each node of the previous layer) computed for each class into a probability, $q_i$, by comparing $z_i$ with the other output logits.

$$q_i = \frac{\exp(z_i/T)}{\sum_j \exp\left(\frac{z_j}{T}\right)} \quad (4)$$

where T is a temperature parameter that is normally set to 1. Using a higher value for T produces a softer probability distribution over classes. In the simplest form of distillation, knowledge is transferred to the distilled model by training it on the same set of face images or on a separate set of face images and using a soft target distribution for each case in the transfer set which in turn is produced by using the cumbersome model with a high temperature in its softmax layer. The same high temperature is used when training the distilled model, but after it has been trained again uses a temperature of 1.

Classifier 224

The classifier 224 is responsible for extracting the identity of a face contained in a video sequence, by assigning to the face a specific identity label. The target is to be able to recognize a face having different poses and under different illumination conditions.

In an exemplary embodiment, a pattern classification scheme is used for classification. In this embodiment, the system has been previously trained offline, using, for example, a database with face images properly annotated. For each video frame, features such as those described in the previous section are evaluated and a total feature vector is formed for each one. Each feature vector is then mapped in the feature space, defined as a multi-dimensional space with as many dimensions as the feature vector length. In such a projection, the feature vectors corresponding to a specific face are concentrated (clustered) in separate and well-defined areas of the multi-dimensional feature space.

Figure 8:
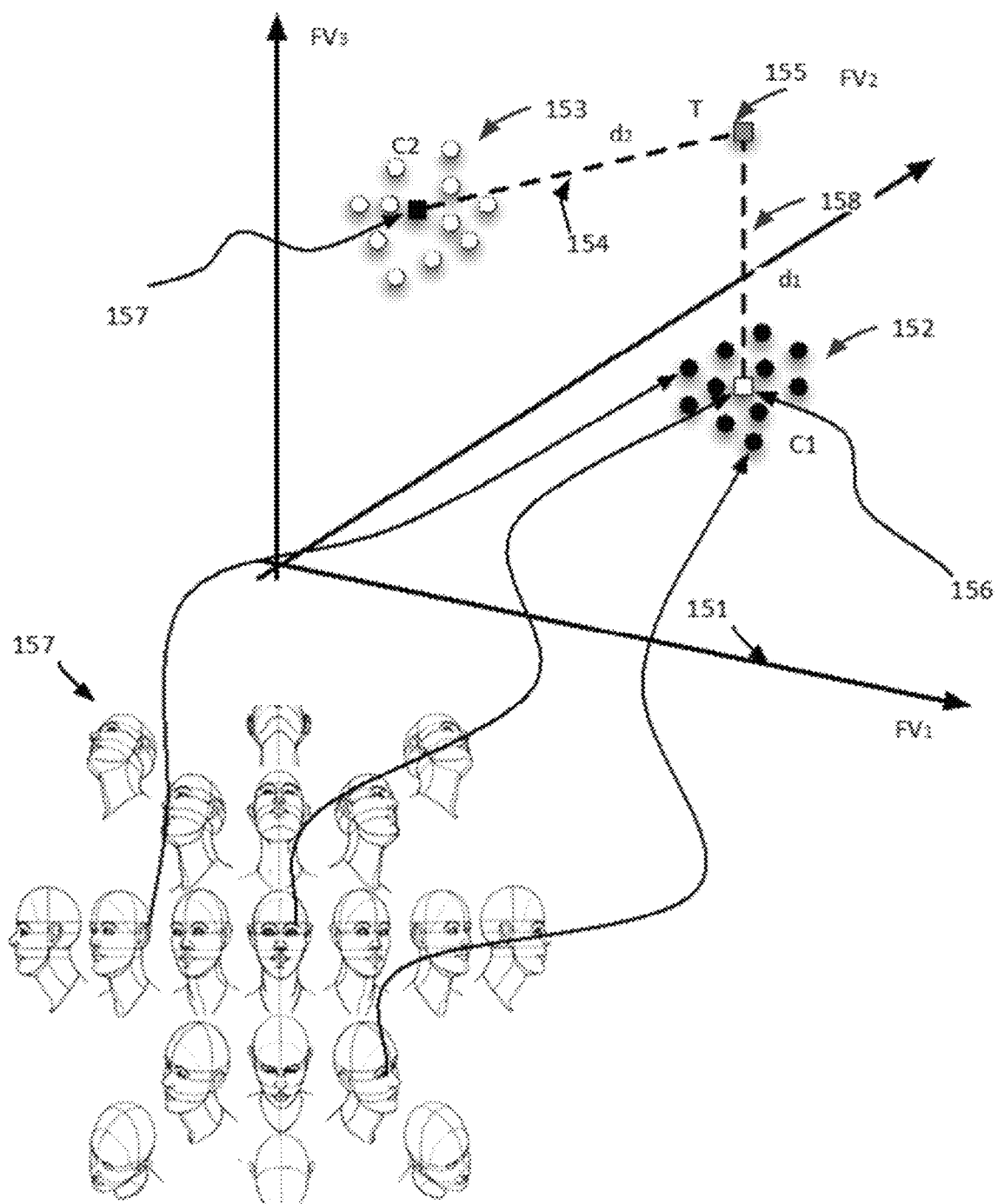
FIG. 8 illustrates an exemplary 3-dimensional feature space in accordance with one exemplary aspect.

Consider the example shown in FIG. 8 demonstrating a 3-dimensional feature vector $\overline{FV}=\{f_1, f_2, f_3\}$, which consequently builds a 3 dimensional feature space 151. Each point in this space is defined by the three coordinates $f_1, f_2, f_3$. The projection of the several regions on this axis-system creates two clusters one corresponding to a face No. 1 153 and one corresponding to face No. 2 152. A cluster like this is formed for every available face in the database.

The elements of the clusters are feature vectors, corresponding to various different poses and illumination conditions of the same face 157. These features are differing by a small amount, yet they feature enough similarity in order to form a cluster.

The next step in the classification process is to compute the centers of the individual clusters. In an exemplary embodiment this is achieved via the calculation of the center of mass of each cluster. The center of mass has coordinates $\overline{C}=\{\bar{f}_1, \bar{f}_2, \ldots, \bar{f}_D\}$ where D is the dimensionality of the feature space, and each coordinate $\bar{f}_k$ is defined as:

$$\bar{f}_k = \frac{1}{N_{NS}} \sum_i f_{ki}$$

where $N_S$ is the number of samples (regions) participating in each cluster. In the 3-dimensional example referred before, the centers of the clusters are indicated as C1 156 and C2 157.

In one exemplary embodiment, the samples of each cluster can be modeled as multivariate normal distributions $N_i(\mu_i, \Sigma_i)$, having a mean $\mu_i$ and a variance $\Sigma_i$. In addition the test features, $\overline{FV}_T$ obtained from the feature extraction unit 224, are also forming a multivariate normal distribution $N_T(\mu_T, \Sigma_T)$. This is achieved by the accumulation of a number k of features (k being a system parameter) corresponding to k video frames.

In an exemplary embodiment, the final classification scheme is performed as follows: the test sample is assigned to the class the distribution to which has the smaller statistical distance (according to a measure) to the test distribution. Various distribution distance measures can be used such as the Mahalanobis distance, Kolmogorov-Smirnov distance, the Kullback-Leibler divergence, the $\chi^2$ statistics distance etc (See *Pattern Classification*, 2nd Edition, Richard O. Duda, Peter E. Hart, David G. Stork Chapter 4, Chapter 6, and Chapter 10, Willey 2000)

In a one exemplary embodiment, the Kullback-Leibler divergence (KL-divergence) metric is used. This is defined by the following formula:

$$D_{KL}(N_i \| N_T) = \frac{1}{2}\left( tr\left(\sum_T^{-1} \sum_i\right) + (\mu_T - \mu_i)^T \sum_T^{-1} (\mu_T - \mu_i) - n + \ln\frac{\det \sum_T}{\det \sum_i} \right) \quad (5)$$

Where $N_i$ and $N_T$ are two multivariate normal distributions with means $\mu_i, \mu_T$ and with covariance matrices $\Sigma_i$ and $\Sigma_T$. The system then classifies the test vector to the class exhibiting the smaller distance from the distribution forming the test vectors.

In one aspect, the associated computational complexity is further reduced by modeling the individual clusters as spherical multivariate Gaussian distributions. In this embodiment, the covariance matrices $\Sigma_i$ and $\Sigma_T$ have only diagonal elements with the rest of the matrix elements having zero value. This feature dramatically simplifies the computations in Eq. (5), since one can only consider the non-zero elements of $\Sigma_i$ and $\Sigma_T$. In addition, the determinants $\det\Sigma_i$ and $\det\Sigma_T$ can be simply calculated as the product of the diagonal elements while the inverse of the covariance matrix $\Sigma_T^{-1}$ can be simply calculated by inversing their diagonal elements. Furthermore, in this embodiment, the non-zero parameters describing each cluster are now reduced from D+D2 to 2D. This allows the reduction of the memory required for saving the user parameters, which is very important in the embedded realm.

In an optional exemplary embodiment, in order to test into which cluster the test point belongs, the distance of this point from the centers of the clusters is computed using an Euclidean distance measure such as the L1 (or absolute) distance, L2 (or root mean squared) distance, etc. In another optional embodiment, the L2 distance is used which is defined as follows: in Cartesian coordinates, if $\overline{P}=(p_1, p_2, \ldots, p_n)$ and $\overline{Q}=(q_1, q_2, \ldots, q_n)$ are two points in Euclidean n-space, then the L2 or Euclidean distance from $\overline{P}$ to $\overline{Q}$, or from $\overline{Q}$, to $\overline{P}$ is given by the following expression:

$$d(\overline{P},\overline{Q})=d(\overline{Q},\overline{P})=\sqrt{\sum_{i=1}^{n}(q_i-p_i)^2} \quad (6)$$

In the 3-dimensional example of FIG. 8, the distance of the test point T 155 from the cluster-center C1 152 is d1 158 and from the cluster-center C2 157 is d2 154.

Once the distances of the test point from the centers of the clusters are computed, the decision about into which cluster this point belongs to is taken according a proximity criterion. That is, the point belongs to the nearest cluster according to the distance measure used. Once this decision has been made, the segment under test has been classified.

In one exemplary embodiment, this metric is computed as follows: First a distance di of a sample $\overline{FV}_T$ from each class-center $\hat{C}_i$ is computed, by modeling the individual sample clusters as a multivariate Gaussian function and by using the following formula:

$$d_i = \frac{1}{\sqrt{(2\pi)^D |\sum_{wn_i}|}} \exp\left(-\frac{1}{2}(\overline{FV}_T - \hat{\mu}_i)^T \sum_{wn_i}^{-1} (\overline{FV}_T - \hat{\mu}_i)\right) \quad (7)$$

where $\mu_i$ is the class mean vector, $\Sigma_{wni}$ is the within class covariance matrix of each class and $|\Sigma_{wni}|$ its determinant. Optimal combination of these decisions, is then implemented as a weighted, linear combination of the individual decisions, with the weights defined as functions of the metrics $d_i$.

In the case where the dimensionality of the feature space (corresponding to the size of the feature vector) is large, dimensionality reduction techniques like t-Distributed Stochastic Neighbor Embedding (tSNE)(See Laurens van der Maaten and Geoffrey Hinton, Visualizing Data using t-SNE, *Journal of Machine Learning Research*, 2008. Vol. 9, pp. 2579-2605—which is incorporated herein by reference in its entirety), PCA (Primary Component Analysis), LDA (Linear Discriminant Analysis) (See Hyvärinen, A.; Oja, E. (2000). "Independent component analysis: Algorithms and applications" (PDF). Neural Networks. 13 (4-5): 411-430. doi: 10.1016/50893-6080(00)00026-5. PMID 10946390—which is incorporated herein by reference in its entirety) or a combination of these two can be used. In this way, the dimensionality of the feature space can be reduced dramatically to a number of NM-1, where NM is the number of different faces that the system will be able to recognize. This fact is extremely important in embedded system implementations where the resources, in terms of memory and processing power, are often limited. In such platforms the linear algebra operations are computationally intensive when engaging large matrices. Therefore, reducing the size of the related matrices is a very critical step towards relaxing the computational needs and achieving real-time or near real-time performance in embedded systems.

In another exemplary embodiment, a Multiclass Linear Discriminant Analysis (MLDA) is used as dimensionality reduction scheme. Multiclass Linear Discriminant Analysis aims to map a set of samples from $N_M$ classes into the linear subspace that best separates the samples of the different classes, while keeping each class as compact as possible. In other words, LDA seeks for the linear projection that maximizes the ratio of between-class variance to the within-class variance. The within-class covariance is the covariance of the samples participating to each class and indicates the spread of the class in the feature space having the meaning of the size or the volume of the class. The between class covariance is computed for the total population and indicates the spread of the total population in the feature space.

In the multivariate case, the separation of the classes along a direction $\overline{w}$ of the feature space is defined as:

$$S = \frac{\overline{w}^T \sum_{btw} \overline{w}}{\overline{w}^T \Sigma \overline{w}} \quad (8)$$

where $\Sigma$ is the covariance matrix of the dataset, $\Sigma_{btw}$ is the between-class covariance matrix:

$$\sum_{btw} = \frac{1}{N_M} \sum_{i=1}^{N_M} (\overline{\mu}_i - \overline{\mu})(\overline{\mu}_i - \overline{\mu})^T \quad (9)$$

$\overline{\mu}$ is the mean of the total population and $\overline{\mu}_i$ is the mean of the i-th class. Seeking of the $k \in \{1, \ldots, N_M-1\}$ orthogonal directions which offer the highest class separation is equivalent of solving the following generalized eigenvalues problem:

$$\Sigma_{btw}\overline{W} = \Sigma_{wn}\overline{W}\lambda, \quad (10)$$

where $\Sigma_{wn}$ is the average within-class covariance matrix. In order to simplify computations, instead of using Eq. (9) the between-class covariance $\Sigma_{btw}$ is computed by subtracting the within-class covariance from the covariance matrix of the data i.e.

$$\Sigma_{btw} = \Sigma - \Sigma_{wn} \quad (11)$$

The k requested orthogonal directions are calculated by selecting the k column vectors of $\overline{W}$ (eigenvectors), which corresponds to the largest k values from the diagonal of the eigenvalues matrix $\overline{\lambda}$. These form a projection matrix $\overline{M_P}$ of dimension $n \times (N_M-1)$. To this end, projecting each feature vector $\overline{P}=(p_1, p_2, \ldots, p_n)$ to the new subspace is equivalent to a vector multiplication of the vector $\overline{P}$ with the projection matrix $\overline{M_P}$ resulting in a new vector $\overline{P}'$ with reduced dimension:

$$\overline{P}' = \overline{P} \cdot \overline{M_P} \quad (12)$$

The classification process as described above can then be applied to the reduced-dimensionality feature space.

In another exemplary embodiment, the required face-pose invariance, is achieved through a fusion process of the individual, provisional classification decisions taken for each individual video frame. The final classification decision is then emerging as some combination of these individual decisions. Decision fusion is a process that optimally combines a number of binary decisions into one more accurate decision according to a metric. Typical fusion rules such as average, max or min over the decisions are also useful and used in some implementations.

Although the aforementioned embodiments have been chosen for their simplicity resulting in high processing speed, other classification schemes such as Support Vector Machines, or Artificial Neural Networks can also be used for the classification in this unit.

The exemplary systems and methods of this disclosure have been described in relation to face detection and CNN training. However, to avoid unnecessarily obscuring the present disclosure, the preceding description omits a number of known structures and devices. This omission is not to be construed as a limitation of the scopes of the claims. Specific details are set forth to provide an understanding of the present disclosure. It should however be appreciated that the present disclosure may be practiced in a variety of ways beyond the specific detail set forth herein.

Furthermore, while the exemplary aspects, embodiments, options, and/or configurations illustrated herein show the various components of the system collocated, certain components of the system can be located remotely, at distant portions of a distributed network, such as a LAN and/or the Internet, or within a dedicated system. Thus, it should be appreciated, that the components of the system can be combined in to one or more devices, such as a Personal Computer (PC), laptop, netbook, smart phone, Personal Digital Assistant (PDA), tablet, etc., or collocated on a particular node of a distributed network, such as an analog and/or digital telecommunications network, a packet-switch network, or a circuit-switched network. It will be appreciated from the preceding description, and for reasons of computational efficiency, that the components of the system can be arranged at any location within a distributed network of components without affecting the operation of the system. Similarly, one or more functional portions of the system could be distributed between a camera device(s) and an associated computing device(s).

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire and/or fiber optics, and may take the form of acoustic or light waves, such as those generated during radio-wave and infra-red data communications.

Also, while the flowcharts and methodology have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide and/or claim some features of the disclosure without providing others.

Optionally, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the disclosed embodiments, configurations and aspects includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as program embedded on personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Examples of the processors as described herein may include, but are not limited to, at least one of Qualcomm® Snapdragon® 800 and 801, Qualcomm® Snapdragon® 610 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Although the present disclosure describes components and functions implemented in the aspects, embodiments, and/or configurations with reference to particular standards and protocols, the aspects, embodiments, and/or configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various aspects, embodiments, and/or configurations, includes components, methods, processes, systems and/or apparatus substantially as depicted and described herein, including various aspects, embodiments, configurations embodiments, subcombinations, and/or subsets thereof. Those of skill in the art will understand how to make and use the disclosed aspects, embodiments, and/or configurations after understanding the present disclosure. The present disclosure, in various aspects, embodiments, and/or configurations, includes providing devices and processes in the absence of items not depicted and/or described herein or in various aspects, embodiments, and/or configurations hereof, including in the absence of such items as may have been used in previous devices or processes, e.g., for improving performance, achieving ease and\or reducing cost of implementation.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

Moreover, though the description has included description of one or more aspects, embodiments, and/or configurations and certain variations and modifications, other variations, combinations, and modifications are within the scope of the disclosure, e.g., as may be within the skill and knowledge of those in the art, after understanding the present disclosure. It is intended to obtain rights which include alternative aspects, embodiments, and/or configurations to the extent permitted, including alternate, interchangeable and/or equivalent structures, functions, ranges or steps to those claimed, whether or not such alternate, interchangeable and/or equivalent structures, functions, ranges or steps are disclosed herein, and without intending to publicly dedicate any patentable subject matter.

REFERENCES—ALL OF WHICH ARE INCORPORATED HEREIN BY REFERENCE IN THEIR ENTIRETY

1. *Empirical Evaluation of Dissimilarity Measures for Color and Texture*, J. Puzicha, et all. The Proceedings of the Seventh IEEE International Conference on Computer Vision, 1999. (Volume 2), pp. 1165-1172.
2. *Pattern Classification,* 2nd Edition, Richard O. Duda, Peter E. Hart, David G. Stork Chapter 4, Chapter 6, and Chapter 10, Willey 2000.
3. Laurens van der Maaten and Geoffrey Hinton, Visualizing Data using t-SNE, *Journal of Machine Learning Research,* 2008. Vol. 9, pp. 2579-2605.
4. Hyvarinen, A.; Oja, E. (2000). "Independent component analysis: Algorithms and applications" (PDF). Neural Networks. 13 (4-5): 411-430. doi:10.1016/S0893-6080 (00)00026-5. PMID 10946390.
5. G Hinton, O Vinyals, J Dean, Distilling the knowledge in a neural network, arXiv preprint arXiv:1503.02531, 2015—arxiv.org
6. Y. Taigman, M. Yang, M. Ranzato, and L. Wolf. Deep-Face: Closing the gap to human-level, performance in face verification. In Proc. CVPR, 2014

The invention claimed is:

1. A method of recognizing a first specific face within a plurality of faces comprising:
   capturing images of the plurality of faces from video frames;
   utilizing information corresponding to various different poses and illumination conditions of any of the plurality of faces concurrently and as a set;
   training a neural network to determine mathematical features for each of the plurality of faces, wherein the neural network is trained to follow a spherical statistical distribution and;
   and
   performing a classification scheme to determine a presence of the first specific face wherein the classifier uses a statistical distance measure suitable for the spherical statistical distribution.

2. The method of claim 1, where the recognition utilizes a hybrid combination of a convolutional neural network and a conventional pattern classification scheme.

3. The method of claim 2, where the conventional classification scheme is based on a statistical distance metric.

4. The method of claim 1, further comparing the first specific face to a stored face for one or more of locking and unlocking a device.

5. The method of claim 1, where the recognition utilizes a hybrid combination of a convolutional neural network and a conventional pattern classification scheme.

6. The method of claim 1, further comprising calculating a mathematical descriptor, represented by a vector of numbers stored in a feature data repository, the descriptor provided to the classifier which stores the feature in a classification data repository.

7. The method of claim 1, further comprising using a last k stored descriptors to produce a face recognition result by using a number of k video frames containing a face of the same person.

8. The method of claim 1, wherein a robust convolutional neural network (CNN) is used for feature extraction.

9. The method of claim 1, wherein the spherical statistical distribution of the computed mathematical features is enforced by the use of a Neural Network wherein the cost function utilizes one or more statistical distance and divergence measures.

10. A non-transitory computer readable information storage media having stored therein instructions, that when executed by one or more processors, cause to be performed a method for social distancing, comprising:
    capturing images of the plurality of faces from video frames;
    utilizing information corresponding to various different poses and illumination conditions of any of the plurality of faces concurrently and as a set;
    training a neural network to calculate mathematical features for each of the plurality of faces, wherein the neural network is trained to follow a spherical statistical distribution and;
    and
    performing a classification scheme to determine a presence of the first specific face wherein the classifier uses a statistical distance measure suitable for the spherical statistical distribution.

11. The media of claim 10, where the recognition utilizes a hybrid combination of a convolutional neural network and a conventional pattern classification scheme.

12. The media of claim 11, where the conventional classification scheme is based on a statistical distance metric.

13. The media of claim 10, further comparing the first specific face to a stored face for one or more of locking and unlocking a device.

14. The media of claim 10, where the recognition utilizes a hybrid combination of a convolutional neural network and a conventional pattern classification scheme.

15. The media of claim 10, further comprising calculating a mathematical descriptor, represented by a vector of numbers stored in a feature data repository, the descriptor provided to the classifier which stores the feature in a classification data repository.

16. The media of claim 10, further comprising using a last k stored descriptors to produce a face recognition result by using a number of k video frames containing a face of the same person.

17. The media of claim 10, wherein a robust convolutional neural network (CNN) is used for feature extraction.

18. The media of claim 10, wherein the spherical statistical distribution of the computed mathematical features is enforced by the use of a Neural Network wherein the cost function utilizes one or more statistical distance and divergence measures.

* * * * *